United States Patent
Isomoto et al.

(10) Patent No.: US 10,266,204 B2
(45) Date of Patent: Apr. 23, 2019

(54) LANE-MAINTAINING CONTROL DEVICE

(71) Applicant: MAZDA MOTOR CORPORATION, Hiroshima (JP)

(72) Inventors: Kazunori Isomoto, Kure (JP); Shusaku Ombe, Hiroshima (JP); Hiroshi Ohmura, Hiroshima (JP); Kouichi Kojima, Hiroshima (JP); Tsuyoshi Arinaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/762,610

(22) PCT Filed: Nov. 9, 2016

(86) PCT No.: PCT/JP2016/083213
§ 371 (c)(1),
(2) Date: Mar. 23, 2018

(87) PCT Pub. No.: WO2017/082289
PCT Pub. Date: May 18, 2017

(65) Prior Publication Data
US 2018/0257707 A1    Sep. 13, 2018

(30) Foreign Application Priority Data
Nov. 12, 2015 (JP) .................. 2015-221782

(51) Int. Cl.
*B62D 15/02* (2006.01)
*B60W 30/12* (2006.01)
*B62D 6/00* (2006.01)

(52) U.S. Cl.
CPC .......... *B62D 15/025* (2013.01); *B60W 30/12* (2013.01); *B62D 6/001* (2013.01);
(Continued)

(58) Field of Classification Search
None
See application file for complete search history.

(56) References Cited

U.S. PATENT DOCUMENTS

| 2009/0030613 A1 | 1/2009 | Kataoka et al. |
| 2011/0010021 A1 | 1/2011 | Kobayashi |

(Continued)

FOREIGN PATENT DOCUMENTS

| JP | 2000-293782 A | 10/2000 |
| JP | 2002-340603 A | 11/2002 |

(Continued)

OTHER PUBLICATIONS

International Search Report issued in PCT/JP2016/083213; dated Feb. 7, 2017.

*Primary Examiner* — Richard M Camby
(74) *Attorney, Agent, or Firm* — Studebaker & Brackett PC

(57) ABSTRACT

A lane-maintaining control device detects a lane width (H1) of a traveling lane (21) through a camera (4) and performs lane-maintaining control without a deviation from the lane width (H1). When detecting, through the camera (4), that the traveling lane (21) gradually increases (H2>H1 where the increasing lane width is (H2)), the lane-maintaining control device continues the lane-maintaining control on a condition that a turn signal is not operated.

9 Claims, 3 Drawing Sheets

(52) U.S. Cl.
CPC ..... *B60W 2540/20* (2013.01); *B60W 2550/14* (2013.01); *B60Y 2300/12* (2013.01); *B60Y 2400/3015* (2013.01)

(56) References Cited

U.S. PATENT DOCUMENTS

| | | | |
|---|---|---|---|
| 2016/0018299 A1* | 1/2016 | Bozarth | B01L 3/5085 436/174 |
| 2018/0237018 A1* | 8/2018 | Goto | B60W 30/14 |

FOREIGN PATENT DOCUMENTS

| | | |
|---|---|---|
| JP | 2006-331219 A | 12/2006 |
| JP | 2007-164636 A | 6/2007 |
| JP | 2008-268157 A | 11/2008 |
| JP | 2009-214786 A | 9/2009 |
| JP | 2015-067030 A | 4/2015 |
| JP | 2015-115040 A | 6/2015 |

\* cited by examiner

LANE-MAINTAINING CONTROL DEVICE

TECHNICAL FIELD

The technology disclosed herein relates to a lane-maintaining control device.

BACKGROUND ART

A vehicle, particularly a motor vehicle, using assist torque for lane-maintaining during driving of a vehicle is increasing. Such assist torque is given for performing steering toward a direction (i.e., a direction toward a lane center position) opposite to a direction of a lane deviation so that the lane-maintaining is supported, i.e., the lane deviation is prevented. A steering force toward a direction in which the assist torque for lane-maintaining is applied is reduced, and thus a driver is naturally made return to the lane center position. Of course, the magnitude of the assist torque for lane-maintaining is limited within a range of magnitude that the driver can overcome without being prevented from performing steering for actively changing the lane.

In such lane-maintaining control, typically, a camera or similar is used to detect a lane width of a traveling lane on which the host vehicle is traveling. Then, a guidance target point is set so that the host vehicle travels along a traveling line formed by connecting middle positions of the lane widths detected.

During the lane-maintaining control, the front of the driving lane on which the host vehicle is traveling might be branched (e.g., bifurcated). In this case, the lane width detected by the lane width detection unit gradually increases at the branching portion. It is suggested to interrupt the lane-maintaining control when the lane width gradually increases in that manner, because the vehicle is on the branch part and it is unclear which road the driver wants to travel unless a turn signal is operated (See Patent Document 1).

CITATION LIST

Patent Document

Patent Document 1: Japanese Unexamined Patent Publication No. 2015-115040

SUMMARY

Technical Problem

Stopping the lane-maintaining control unconditionally when the lane width gradually increases because of the branch of the lane often does not meet an intention of the driver. Most of branch roads are a side way for a main road. The driver of a vehicle traveling on the main road with a support of the lane-maintaining control mostly intends to continue to travel on the main road. If intending to change to the side way, the driver typically operates a turn signal to get off the main road.

The technology disclosed herein is made in consideration of the above circumstances, and it is an object thereof is to provide a lane-maintaining control device capable of continuing lane-maintaining control as much as possible even when the lane width gradually increases.

SUMMARY OF THE INVENTION

In order to achieve the object, the technique disclosed herein employs the following solution. Specifically, the device disclosed herein is a lane-maintaining control device for performing lane-maintaining control for guiding a host vehicle toward a guidance target point set on a traveling lane on which a host vehicle is traveling, the lane-maintaining control device comprising; a lane width detection unit configured to detect a lane width of the traveling lane; an interruption unit configured to interrupt the lane-maintaining control when the lane width detection unit detects that the traveling lane gradually increases during the lane-maintaining control; a turn signal operation detecting unit configured to detect that a turn signal of the host vehicle is operated; and a prohibiting unit configured to prohibit the interruption unit from interrupting the lane-maintaining control to continue the lane-maintaining control in a case of a specific state in which the lane width detection unit detects that the traveling lane gradually increases and the turn signal operation detecting unit does not detect that the turn signal is operated.

The solution described above can provide the increased opportunities of executing the lane-maintaining control. The lane-maintaining control is continued on condition that the turn signal is not operated. In other words, the lane-maintaining control is not continued when an intended road for traveling is changed. Thus, a driver's unintentional lane-maintaining control can be prevented.

Preferred embodiments on the premise of the above solution are as described below. Specifically, the guidance target point is set at a middle position between left and right sides of the lane width detected by the lane width detection unit, and the lane-maintaining control in the specific state is continued by setting the guidance target point based on a lane width in a position farther than a position of a normal state. In this case, the lane-maintaining control can be continued based on the lane width farther than the portion where the lane width gradually increases.

The lane width detection unit detects a distance, as a lane width, between left and right white lines of the traveling lane; the guidance target point is set at a middle position between left and right sides of the lane width detected by the lane width detection unit; and when either one of the left and right white lines of the travel lane is a dotted line portion, the lane-maintaining control in the specific state is continued by regarding the dotted line portion as one of the white lines and setting the guidance target point. In this case, the dotted line is effectively used such that the lane-maintaining control can be continued.

The lane width detection unit detects a distance, as a lane width, between left and right white lines of the traveling lane; the guidance target point is set at a middle position between left and right sides of the lane width detected by the lane width detection unit; and when either one of the left and right white lines of the travel lane is a dotted line portion, the lane-maintaining control in the specific state is continued by regarding the other one of the white lines as a reference and setting the guidance target point. In this case, the other one of the while lines is effectively used such that the lane-maintaining control can be continued.

The lane width detection unit detects a distance, as a lane width, between left and right white lines of the traveling lane; the guidance target point is set at a middle position between left and right sides of the lane width detected by the lane width detection unit; and when either one of the left and right white lines of the travel lane is a dotted line portion, the lane-maintaining control in the specific state is continued by regarding the dotted line portion as a reference and setting the guidance target point. In this case, the dotted line is effectively used such that the lane-maintaining control can be continued.

A storage unit configured to store the lane width detected by the lane width detection unit just before the lane width increases is provided, and the lane-maintaining control in the specific state is continued by setting the guidance target point based on the lane width stored in the storage unit. In this case, the lane width detected just before the lane width increases is effectively used such that the lane-maintaining control can be continued.

The lane width detection unit detects a distance, as a lane width, between left and right white lines of the traveling lane; the guidance target point is set at a middle position between left and right sides of the lane width detected by the lane width detection unit; and when either one of the left and right white lines of the travel lane is a dotted line portion, the lane-maintaining control in the specific state is continued by setting the guidance target point based on a lane width just before the dotted line portion and a lane width just after the dotted line portion. In this case, the dotted line and the lane width just before the dotted line are effectively used such that the lane-maintaining control can be continued.

The lane-maintaining control in the specific state is continued by regarding a road having a wide lane width as a traveling lane of the host vehicle among roads ahead of which the lane widths gradually increase, and setting the guidance target point. In this case, in consideration of the situation where travel on a wide road is intended in many cases, the lane-maintaining control can be continued.

The lane-maintaining control device includes a camera configured to take an image of a front of a host vehicle; a turn signal switch configured to detect a turn signal operation conducted by a driver; and a controller configured to perform lane-maintaining control, the controller receiving a signal of the image taken by the camera and outputting a control signal to an electric power steering device to guide the host vehicle toward a guidance target point set on the traveling lane on which the host vehicle is currently traveling based on the signal of the image. The controller interrupts the lane-maintaining control when detecting that the traveling lane gradually increases based on the signal of the image taken by the camera during the lane-maintaining control, and the controller prohibits interruption of the lane-maintaining control to continue the lane-maintaining control in a specific state in which the controller detects that the traveling lane gradually increases based on the signal of the image taken by the camera during the lane-maintaining control and the controller does not receive a turn signal operation signal from the turn signal switch.

Advantages of the Invention

The technique disclosed herein can provide the increased opportunities of executing the lane-maintaining control.

DESCRIPTION OF EMBODIMENTS

Figure 1:
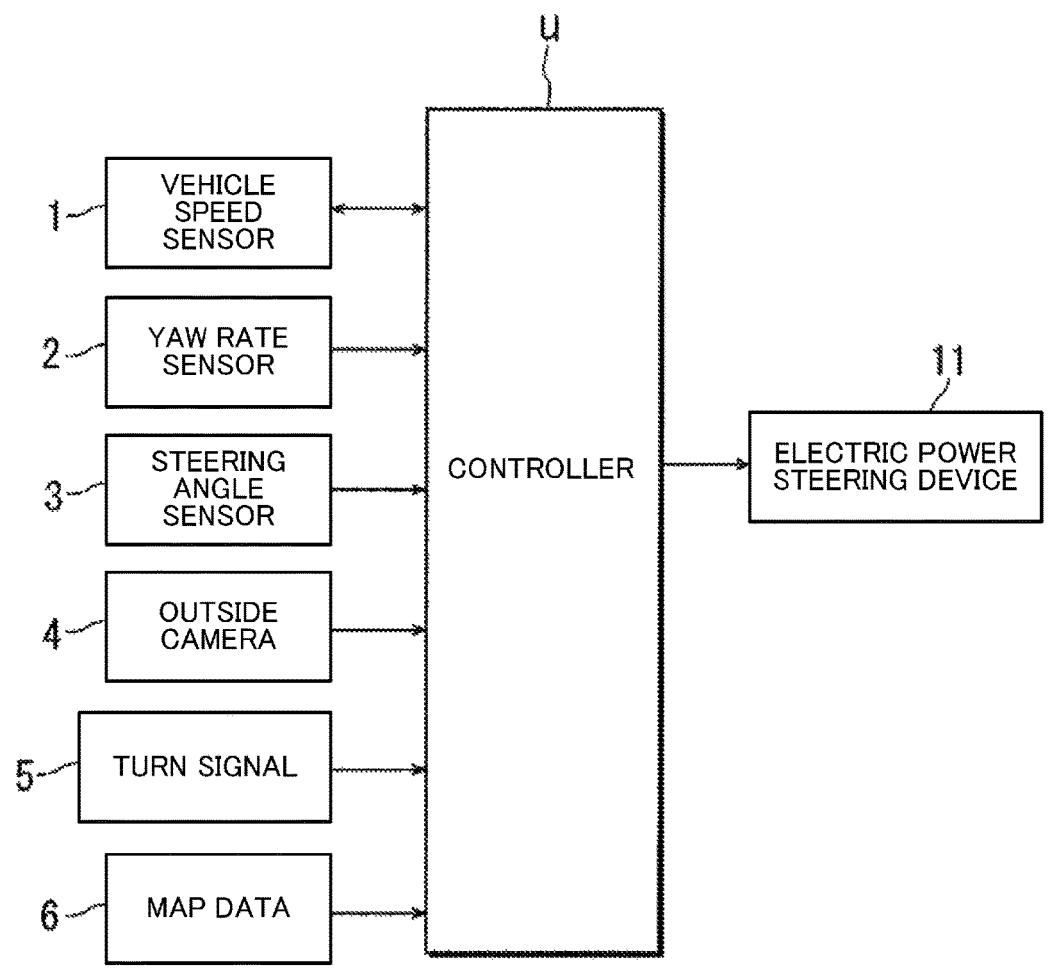
FIG. 1 is a block diagram showing an example of a control system of a vehicle including a lane-maintaining control device.

FIG. 1 is a block diagram showing a control system of a vehicle (for example, an automobile) having a lane-maintaining control device. As shown in the figure, the control system includes a controller (control unit) U using a microcomputer. Signals from a vehicle speed sensor 1, a yaw rate sensor 2, a steering angle sensor 3, a camera 4 taking an image of the front of a vehicle, a turn signal switch 5, and map data (a navigation device) 6 are input to the controller U. The controller U controls an electric power steering device 11 during lane-maintaining control. The camera 4 detects white lines (lane markers) which are boundaries of both sides of the lane on which the vehicle is traveling.

Figure 2:
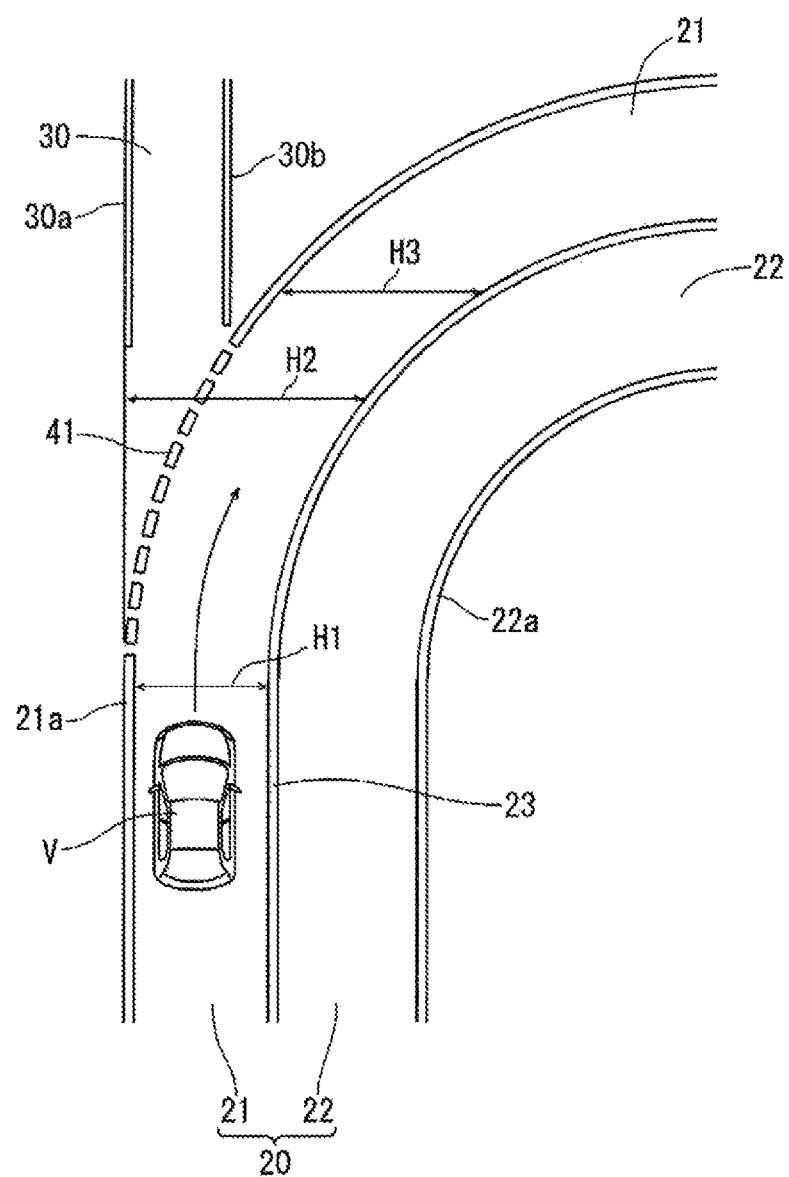
FIG. 2 is a diagram for explaining an outline of a lane-maintaining control.

FIG. 2 illustrates a situation where a vehicle V as a host vehicle is traveling on a main road 20. The main road 20 has a single lane on one side. The lane on which the vehicle V is traveling is indicated by reference numeral 21. The opposite lane is indicated by reference numeral 22. A central boundary line between the lanes 21 and 22 is indicated by reference numeral 23. The lane 21 is defined by the central boundary line 23 as one white line and the other white line 21a. The lane 22 is defined by the central boundary line 23 as one white line and the other white line 22a.

The main road 20 is curved to the right in front of the vehicle V. From the vicinity of the beginning of this curve, a branch road 30 that is a side way almost straight to the main road 20 is branched. The branch road 30 is defined by a left white line 30a and a right white line 30b. The side way 30 has a single lane as a whole. The width thereof is narrower than the main road 20.

At the boundary between the main road 20 and the branch road 30, a dotted line 41 is provided (illustrated). The dotted line 41 is illustrated along the central boundary line 23. In other words, the dotted line 41 curves to the right along the curve of the central boundary lane 23 to serve as an extended line of the white line 21a on the left side of the lane 21, and to show an entrance of the branch road 30.

Before the dotted line 41, the camera of the vehicle V recognizes the width of the lane 21 as a lane width H1 which is an interval between the central boundary line 23 and the white line 21a. The middle position of this lane width H1 is used as a guidance target point so that the lane-maintaining control is performed.

Around the boundary with the branch road 30, the lane width becomes H2. The central boundary line 23 and a shoulder on the extended line of the white line 30a of the branch road 30 are recognized as a lane width. The lane width H2 gradually increases from a side closer to the vehicle V to a side farther from the vehicle V in a length range in which the dotted line 41 exists. A lane width in a portion farther than the dotted line 41 is recognized as H3. This lane width H3 is generally the same as the lane width H1.

When the lane width gradually increases as the lane width H2 indicates, the lane-maintaining control is stopped (interrupted) in Patent Document 1. In the technique disclosed herein, even when the lane width gradually increases as the lane width H2 indicates, it is decided that traveling is kept on the main road 20 (the lane 21) and then the lane-maintaining control is continued, unless a turn signal is operated, or unless a turn signal for the left direction is operated to shift to the branch road 30.

Continuation of the lane-maintaining control for travel on the lane 21 will be described. In the embodiment, the guidance target point is set along the central boundary line 23 with the lane width H1 before the dotted line 41 as a lane width, and the lane-maintaining control is continued. Note that the lane-maintaining control can be performed with, for example, the techniques of the prior art disclosed in Patent Document 1, Japanese Unexamined Patent Publication No. 2016-011060 and No. 2016-148893 filed by the applicant of this application.

Figure 3:
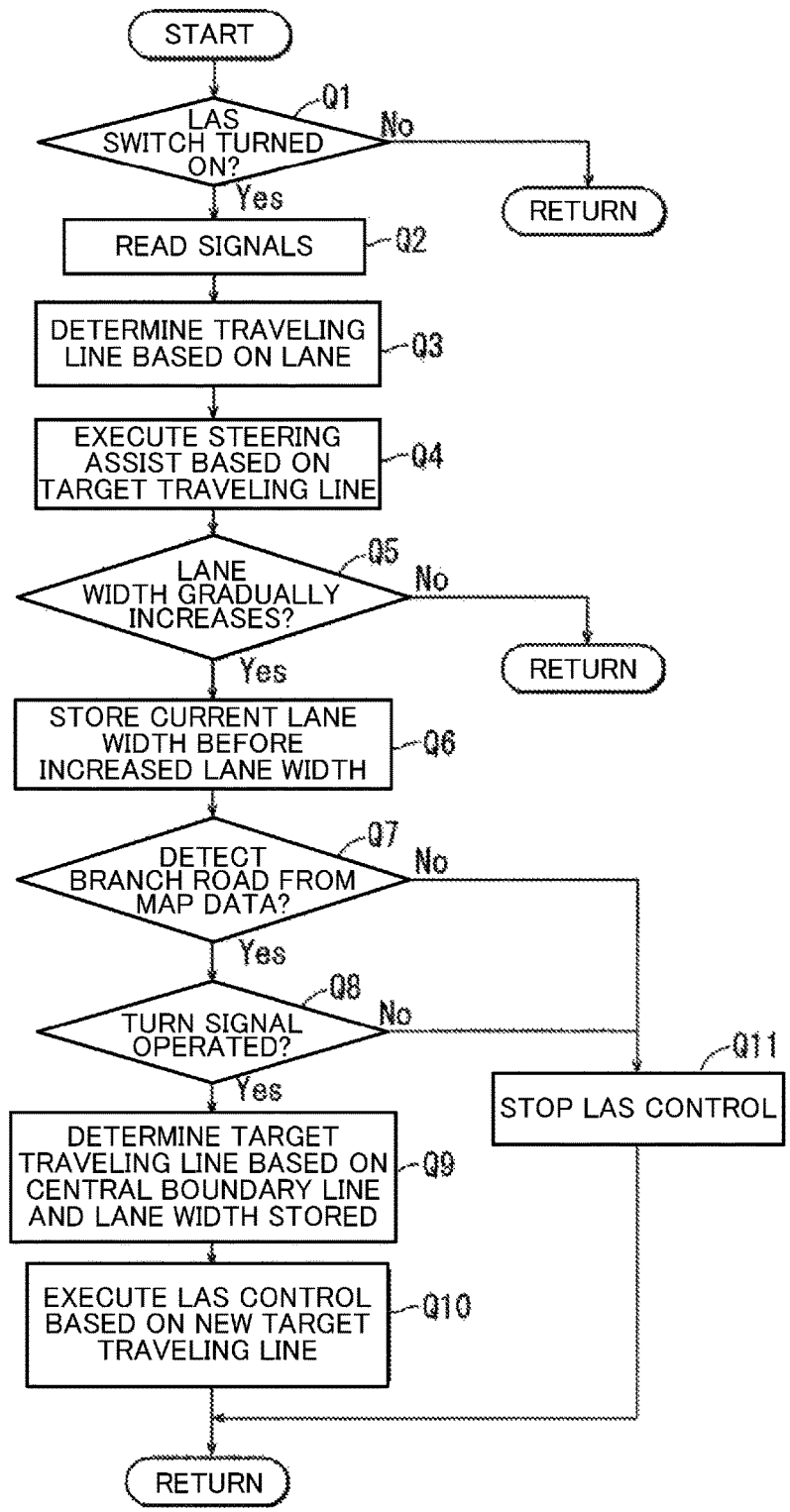
FIG. 3 is a flowchart showing a control procedure of an example of a lane-maintaining control.

A specific example of the lane-maintaining control disclosed herein will be described with reference to a flowchart shown in FIG. 3. In the following description, Q represents a step. First, in Q1, it is determined whether an LAS switch (a manually operated switch as to whether the lane-maintaining control is executed) (not shown) is turned on. If the determination in Q1 is NO, the lane-maintaining control is not executed, and the process proceeds to a return.

If the determination in Q1 is YES, signals from the sensors 1 to 6 are read in Q2. Then, in Q3, a target traveling line is determined based on the lane. In FIG. 2, the target traveling line corresponds to a line between the vehicle V and the guidance target point. The guidance target point is the middle position between the central boundary line 23 and the white line 21a. In addition to the exactly middle position, the middle position includes positions near the middle position: positions deviated toward the central boundary line 23 and toward of the white line 21a. After Q3, in Q4, steering assist torque determined for traveling along the target traveling line is given so that the lane-maintaining control is performed.

After Q4, in Q5, it is determined whether the lane width gradually increases. In other words, in FIG. 2, the lane width H2 is detected. If the determination in Q5 is NO, the process proceeds to a return, i.e., the process continues the lane-maintaining control. If the determination in Q5 is YES, a lane width positioned just before the lane width starting gradually increasing is stored in Q6. In other words, in FIG. 2, the lane width H1 is stored.

After Q6, in Q7, it is determined whether a branch road exists at a portion where the lane width gradually increases based on the map data. If the determination in Q7 is YES, it is determined in Q8 whether the turn signal (a direction indicator) is not turned on (whether the turn signal is not being operated). If the determination in Q 8 is YES, the target traveling line is determined in Q9 based on the central boundary line 23 and the lane width stored in Q6. In other words, the traveling line of which the guidance target point is the middle position between the central boundary line 23 and the lane width stored is determined. Then, in Q10, the lane-maintaining control is performed so that traveling along the target traveling line determined in Q9 is done. In other words, in FIG. 2, the lane-maintaining control for traveling on the lane 21 of the main road 20 is continued.

If the determination in Q7 is NO, or the determination in Q8 is NO, the lane-maintaining control is stopped in Q11. Note that, after Q11, the lane-maintaining control is restarted when the lane width where the vehicle V newly travels is clearly confirmed. In this case, the lane-maintaining control may be restarted on a condition that a driver's intention of restart is confirmed, e.g., a restart switch is turned on.

Here, when the lane width gradually increases and the lane-maintaining control continues, the following are conceivable in addition to the above-described embodiment.

(1) The lane-maintaining control can be continued with the distance between the central boundary line 23 and the dotted line 41 as the lane width. In other words, the dotted line 41 is regarded as one of the white lines for the control.

(2) The lane-maintaining control can be continued assuming a predetermined lane width along the dotted line 41 (for example, assuming the lane width H1 positioned just before the dotted line 41).

(3) The lane-maintaining control can be continued assuming a lane width positioned slightly farther than the dotted line 41 (the lane width H3 in FIG. 2).

(4) The lane-maintaining control can be continued assuming a lane width (for example, assuming an arithmetic mean of the lane widths, or specifically assuming a lane width which is a half of the sum value of H1 and H3 in FIG. 2) based on the lane width positioned just before the dotted line 41 (the lane width H1 in FIG. 2) and the lane width positioned just after the dotted line 41 (the lane width H3 in FIG. 2).

Although the embodiment has been described above, the technique disclosed herein is not limited to the above-described embodiment, but can be appropriately modified within the scope described in the claims. For example, suppose that the lane width gradually increases and it can be determined based on the map data that the road currently being traveled is a main road having a wider road width than a road existing near the road currently being traveled. In this case, it can be determined that the main road is a road that a driver intend to and want to travel so that the lane-maintaining control is continued. The regulation of the lane width can be made with the shoulder as well as the white lines and the dotted lines. The purpose of the technique disclosed herein is not limited to what is specified, but also implicitly includes providing what is expressed as substantially preferable or advantageous.

INDUSTRIAL APPLICABILITY

The technique disclosed herein can secure a sufficient opportunity to execute the lane-maintaining control of the vehicle.

DESCRIPTION OF REFERENCE CHARACTERS

U Controller
1 Vehicle Speed Sensor
2 Yaw Rate Sensor
3 Steering Angle Sensor
4 Camera
5 Turn Signal Switch
6 Map Data (Navigation Device)
V Vehicle
20 Main Road
21 Lane
21a White Line
22 Lane
22a White Line
23 Central Boundary Line
30 Branch Road
30a White Line
30b White Line
41 Dotted Line
H1 Lane Width (Positioned Just Before Dotted Line)
H2 Lane Width (Gradually Increasing)
H3 Lane Width (Positioned Just After Dotted Line)

The invention claimed is:

1. A lane-maintaining control device for performing lane-maintaining control for guiding a host vehicle toward a guidance target point set on a traveling lane on which a host vehicle is traveling, the lane-maintaining control device comprising;
  a lane width detection unit configured to detect a lane width of the traveling lane;
  an interruption unit configured to interrupt the lane-maintaining control when the lane width detection unit detects that the traveling lane gradually increases during the lane-maintaining control;
a turn signal operation detecting unit configured to detect that a turn signal of the host vehicle is operated; and
a prohibiting unit configured to prohibit the interruption unit from interrupting the lane-maintaining control to continue the lane-maintaining control in a case of a specific state in which the lane width detection unit detects that the traveling lane gradually increases and the turn signal operation detecting unit does not detect that the turn signal is operated.

2. The lane-maintaining control device of claim 1, wherein
the guidance target point is set at a middle position between left and right sides of the lane width detected by the lane width detection unit, and
the lane-maintaining control in the specific state is continued by setting the guidance target point based on a lane width in a position farther than a position of a normal state.

3. The lane-maintaining control device of claim 1, wherein
the lane width detection unit detects a distance, as a lane width, between left and right white lines of the traveling lane,
the guidance target point is set at a middle position between left and right sides of the lane width detected by the lane width detection unit, and
when either one of the left and right white lines of the travel lane is a dotted line portion, the lane-maintaining control in the specific state is continued by regarding the dotted line portion as one of the white lines and setting the guidance target point.

4. The lane-maintaining control device of claim 1, wherein
the lane width detection unit detects a distance, as a lane width, between left and right white lines of the traveling lane,
the guidance target point is set at a middle position between left and right sides of the lane width detected by the lane width detection unit, and
when either one of the left and right white lines of the travel lane is a dotted line portion, the lane-maintaining control in the specific state is continued by regarding the other one of the white lines as a reference and setting the guidance target point.

5. The lane-maintaining control device of claim 1, wherein
the lane width detection unit detects a distance, as a lane width, between left and right white lines of the traveling lane,
the guidance target point is set at a middle position between left and right sides of the lane width detected by the lane width detection unit, and
when either one of the left and right white lines of the travel lane is a dotted line portion, the lane-maintaining control in the specific state is continued by regarding the dotted line portion as a reference and setting the guidance target point.

6. The lane-maintaining control device of claim 1, comprising:
a storage unit configured to store the lane width detected by the lane width detection unit just before the lane width increases, wherein
the lane-maintaining control in the specific state is continued by setting the guidance target point based on the lane width stored in the storage unit.

7. The lane-maintaining control device of claim 1, wherein
the lane width detection unit detects a distance, as a lane width, between left and right white lines of the traveling lane,
the guidance target point is set at a middle position between left and right sides of the lane width detected by the lane width detection unit, and
when either one of the left and right white lines of the travel lane is a dotted line portion, the lane-maintaining control in the specific state is continued based on a lane width just before the dotted line portion and a lane width just after the dotted line portion.

8. The lane-maintaining control device of claim 1, wherein
the lane-maintaining control in the specific state is continued by regarding a road having a wide lane width as a traveling lane of the host vehicle among roads ahead of which the lane widths gradually increase, and setting the guidance target point.

9. A lane-maintaining control device, comprising:
a camera configured to take an image of a front of a host vehicle;
a turn signal switch configured to detect a turn signal operation conducted by a driver; and
a controller configured to perform lane-maintaining control, the controller receiving a signal of the image taken by the camera and outputting a control signal to an electric power steering device to guide the host vehicle toward a guidance target point set on the traveling lane on which the host vehicle is currently traveling based on the signal of the image,
wherein the controller interrupts the lane-maintaining control when detecting that the traveling lane gradually increases based on the signal of the image taken by the camera during the lane-maintaining control, and
the controller prohibits interruption of the lane-maintaining control to continue the lane-maintaining control in a specific state in which the controller detects that the traveling lane gradually increases based on the signal of the image taken by the camera during the lane-maintaining control and the controller does not receive a turn signal operation signal from the turn signal switch.

* * * * *